March 20, 1962 G. H. MULLER 3,026,508
SIGNAL SYSTEM FOR GUIDING A CAR INTO A GARAGE
Filed Feb. 26, 1959 5 Sheets-Sheet 1

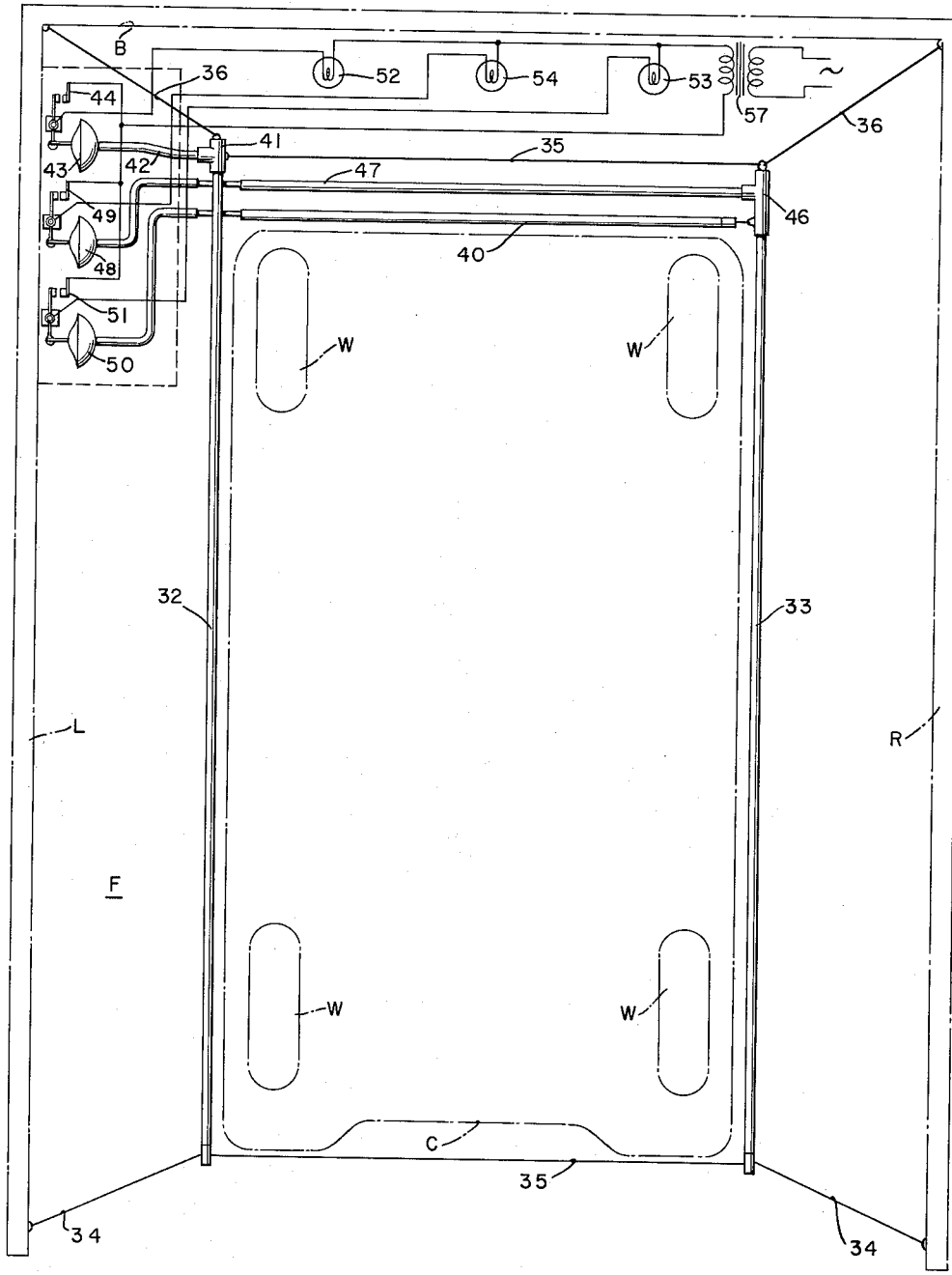

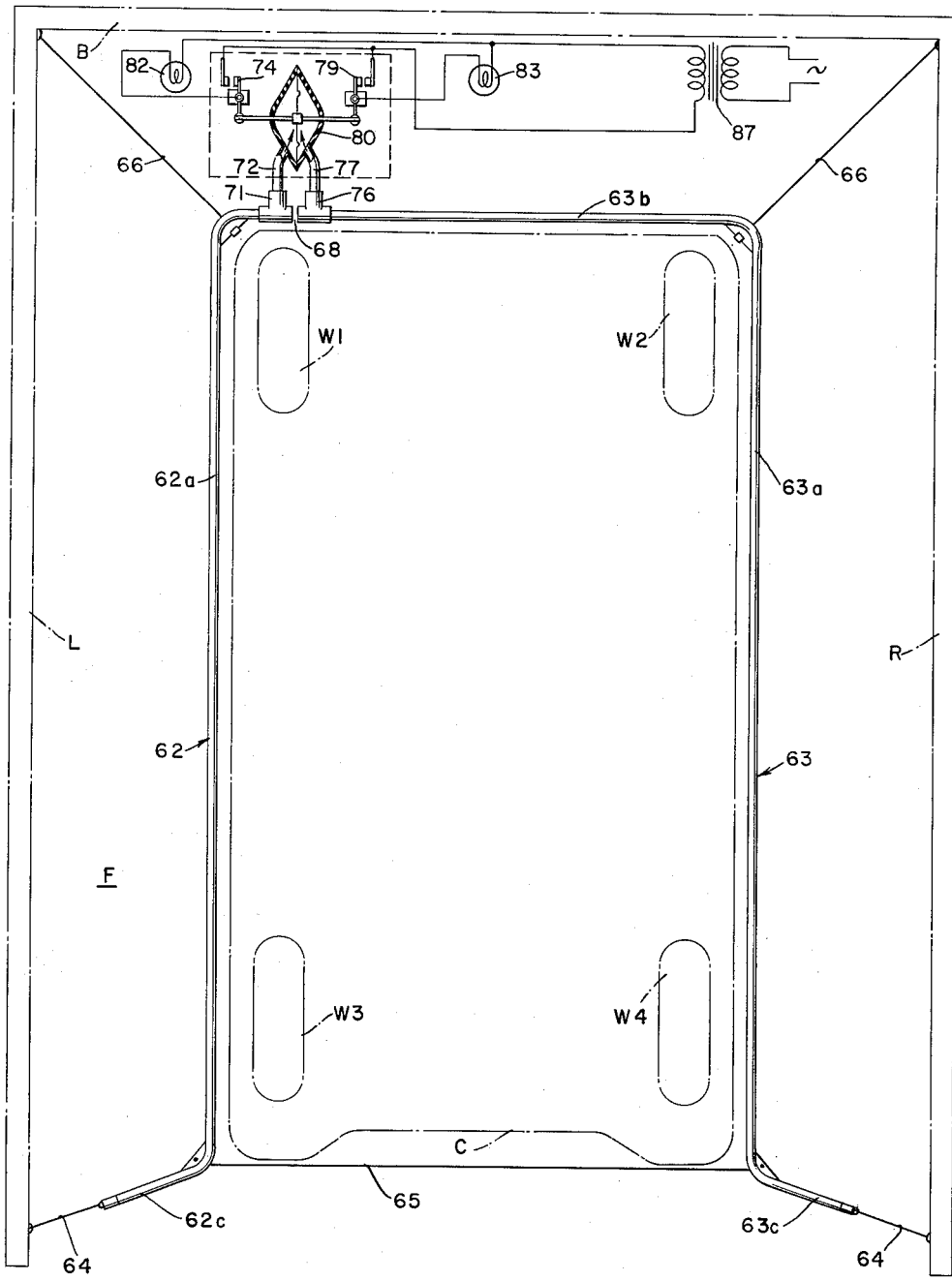

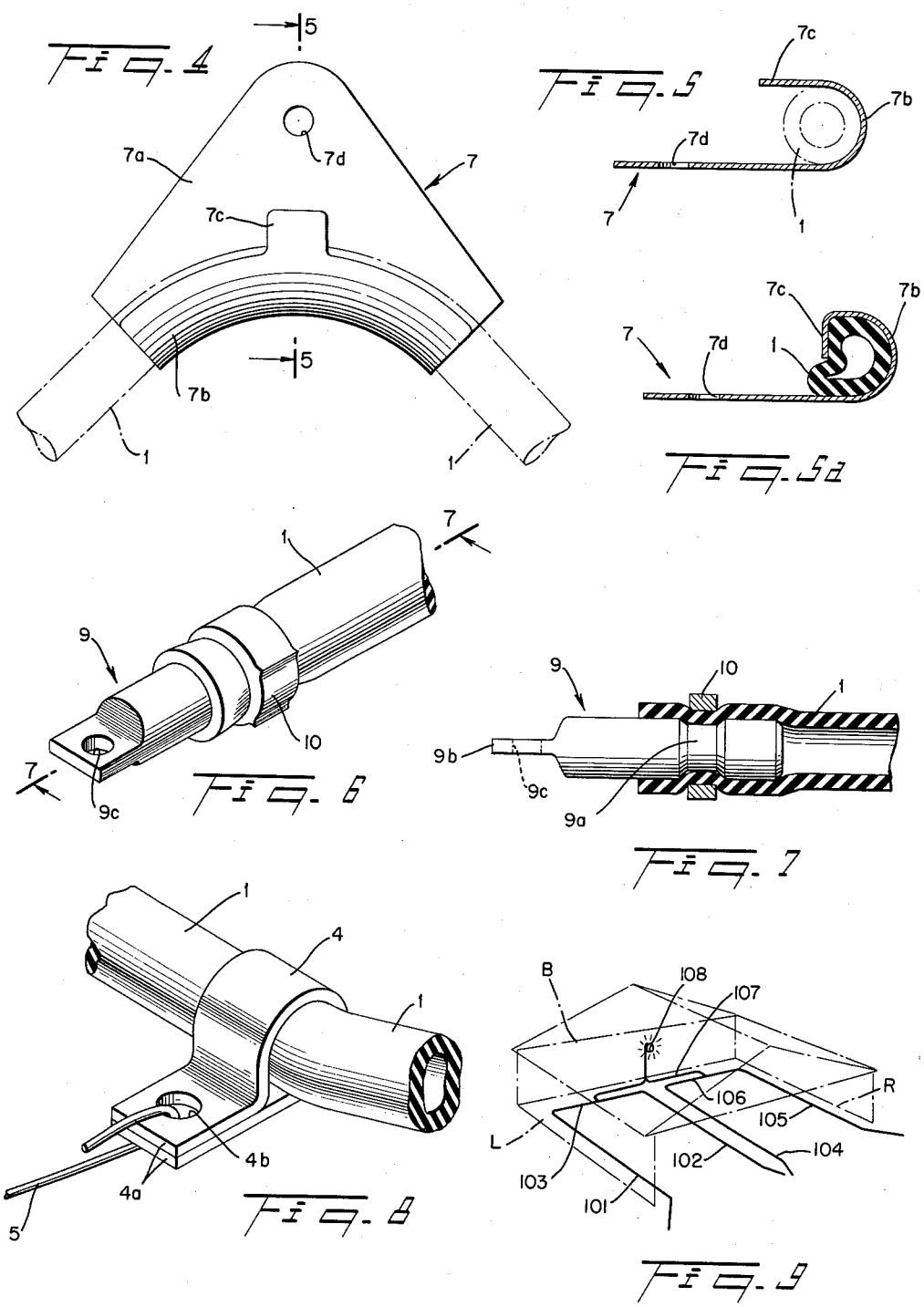

March 20, 1962 G. H. MULLER 3,026,508
SIGNAL SYSTEM FOR GUIDING A CAR INTO A GARAGE
Filed Feb. 26, 1959 5 Sheets-Sheet 5
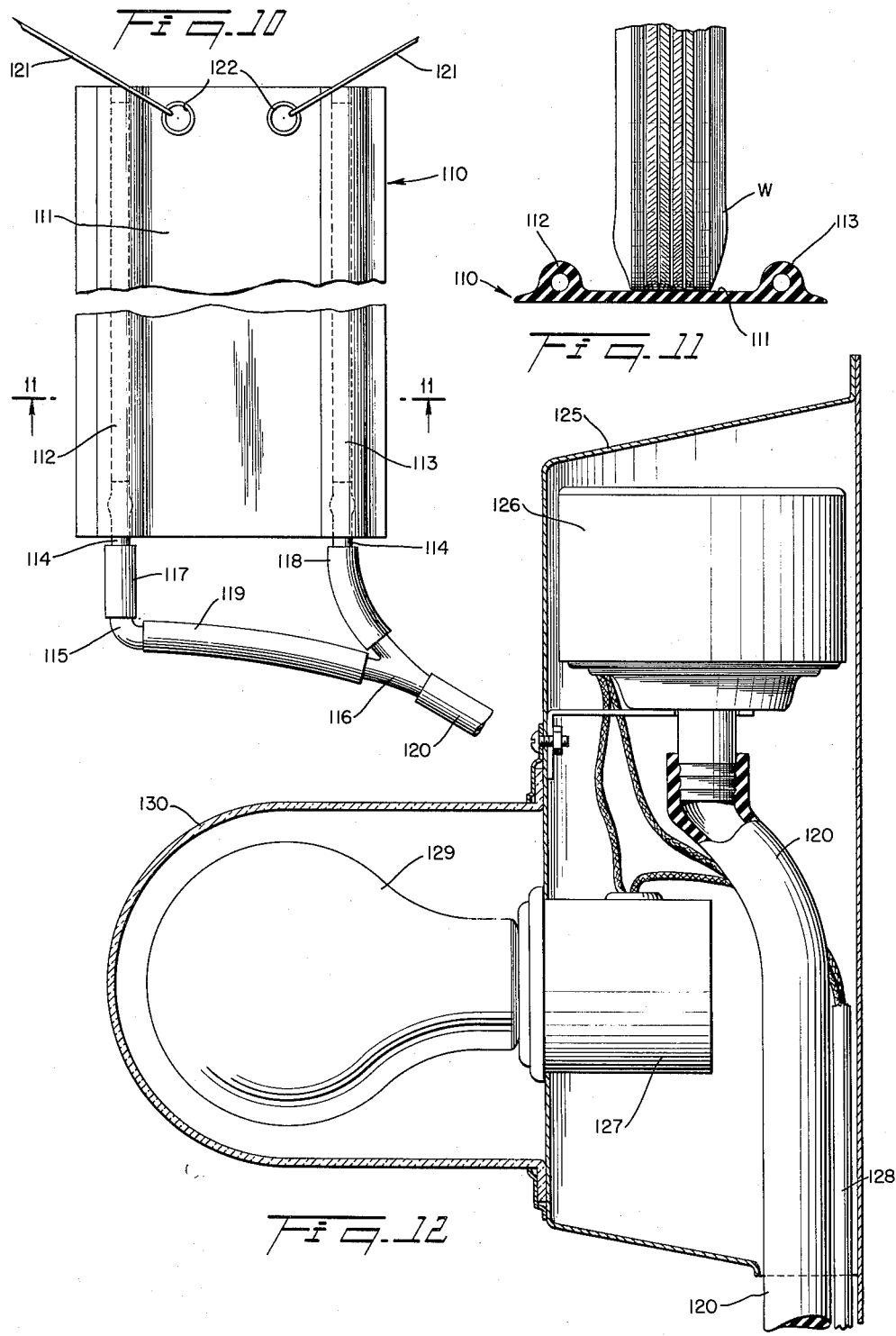

United States Patent Office 3,026,508
Patented Mar. 20, 1962

3,026,508
SIGNAL SYSTEM FOR GUIDING A CAR INTO A GARAGE
George H. Muller, 215 Hill St., Northville, Mich.
Filed Feb. 26, 1959, Ser. No. 795,872
7 Claims. (Cl. 340—282)

The present invention relates to a signal system for guiding a car into a garage, car port or other parking space. This application is a continuation-in-part of my copending application Serial Number 637,165 filed January 30, 1957, now abandoned.

When a car is being driven into or backed out of a garage, care must be taken to avoid hitting the door posts, sidewalls of the garage or articles such as mowing machines, bicycles, etc. stored along one or both sidewalls. There is also the possibility of driving the car in too far and bumping into the rear wall of the garage. The difficulties of driving a car into a garage and backing it out again have increased in recent years because of the increased width and length of automobiles and the use of higher fenders. The greater width and length of present day cars result in decreased clearance, while the wider and boxier front ends in combination with lower seats and lower roof decrease the field of vision of the driver. Moreover, scraped or dented fenders have become increasingly expensive to repair or replace.

It is an object of the present invention to assist the driver when parking a car in a garage so as to avoid striking the walls or other objects in the garage. In accordance with the invention, there is provided a simple and inexpensive signal system which is easily installed even in existing garages and which warns the driver in the event the car comes too close to either sidewall or to the rear wall of the garage.

The system comprises elongated pressure responsive elements extending along the floor at a selected distance from and parallel to the walls of the garage and signal means connected to and actuated by the pressure responsive elements. The position of pressure responsive elements is selected so that if a car comes too close to a door post or wall of the garage, a wheel of the car will run on and thereby apply pressure to one of said elements to actuate the signal means and thus warn the driver.

The nature, objects, and advantages of the invention will be more fully understood from the following description of preferred embodiments and from the accompanying drawings in which:

FIG. 2 is a similar view showing another embodiment of the invention.

FIG. 3 is a similar view showing a third embodiment.

FIG. 4 is a detail plan showing a corner anchoring member for the pressure responsive element of the system.

FIG. 5 is a section taken approximately on the line 5—5 in FIG. 4.

FIG. 5a is a similar section after a tab on the anchoring member has been bent down to secure the pressure responsive element.

FIG. 6 is a detail perspective view showing an end anchoring member.

FIG. 7 is a section taken approximately on the line 7—7 in FIG. 6.

FIG. 8 is a detail perspective view showing an intermediate anchoring member.

FIG. 9 is a small scale schematic view showing a signal system for a two car garage.

FIG. 10 is a fragmentary plan of another form of pressure element.

FIG. 11 is a section on the line 11—11 in FIG. 10.

FIG. 12 is a vertical section of a signal unit.

Figure 1:
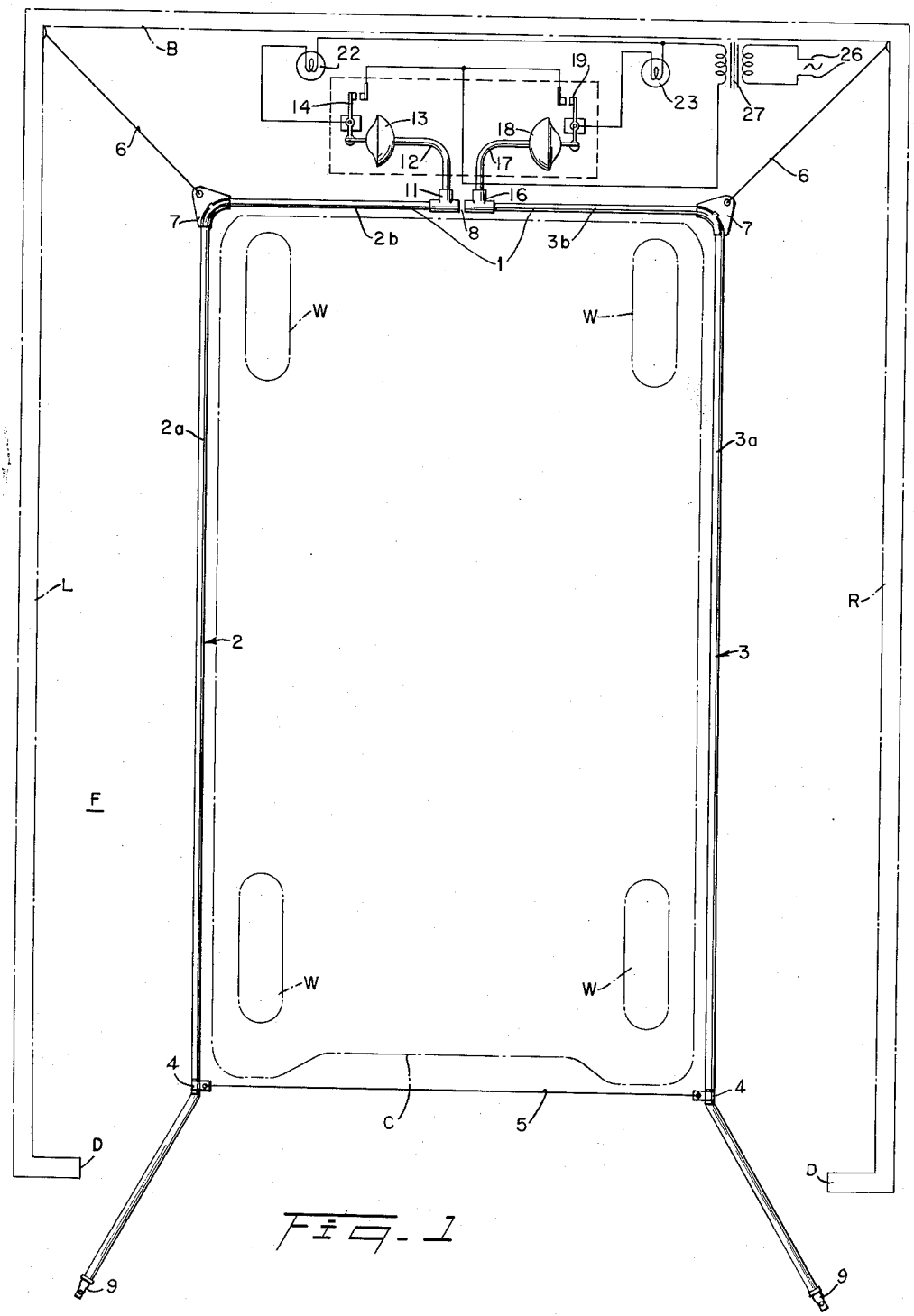
FIG. 1 is a plan of a garage with a signal system in accordance with the invention installed therein, certain circuitry of the system being shown diagrammatically.

In FIG. 1 there is illustrated a garage having a floor F, a left sidewall L, a right sidewall R, door posts D and a rear or back wall B. A car parked in the garage is indicated schematically by an outline designated C. The wheels of the car are likewise shown in outline and designated W.

The signal system in accordance with the invention comprises elongated pressure responsive elements extending along the floor of the garage at a selected distance from, and approximately parallel to, the sidewalls L and R, means for anchoring the pressure responsive elements in position and signal means connected to and actuated by the pressure responsive elements. The position of the elongated pressure responsive elements is such that if a car comes too close to either door post or sidewall while the car is being driven into or out of the garage, one or more wheels of the car will run on and thereby apply pressure to the pressure responsive element so as to actuate the signal means which is placed so as to be observable by the driver of the car and thereby enables him to correct the direction of the car.

The signal means may be audible, visual or both and may be actuated electrically, mechanically or by fluid pressure. For the sake of simplicity and effectiveness, an electrically operated lamp, buzzer or bell is preferred as the signalling means. Likewise, the elongated pressure responsive elements adapted to be engaged by the car wheels in the event the car deviates materially from a predetermined path may operate electrically, mechanically or by fluid pressure. For example, the pressure responsive element may comprise a rubber tube or channel carrying on its interior bare electrical conductors which are brought together to close a circuit when the channel or tube is compressed. However, in the preferred embodiment of the invention, the pressure responsive element comprises a sealed fluid-filled tube connected with a pressure responsive electrical switch. When the tube is compressed by a car wheel running on it, the switch is actuated by the resulting increase in fluid pressure.

In the embodiment of the invention illustrated in FIG. 1 the pressure responsive means engageable by the wheels of the car comprises a fluid-filled rubber tube or hose 1 having a left hand portion 2 and a right hand portion 3. The term "rubber" is herein used to include not only natural rubber compounds but synthetic rubber or plastic compounds having similar characteristics. The tube preferably has a diameter of the order of ½ inch to 1 inch and the walls of the tube 1 are sufficiently flexible for the tube to be flattened by the wheel of a car and sufficiently elastic to return to the original configuration when released. The tube 2 comprises a longitudinal portion 2a which is spaced from and approximately parallel to the left wall L of the garage and a transverse portion 2b which extends away from the sidewall L and is spaced from and approximately parallel to the rear wall B. Similarly, the tube 3 has a longitudinal portion 3a which is spaced from and approximately parallel to the right side wall R and a transverse portion 3b which extends away from the sidewall and is spaced from and approximately parallel to the rear wall of the garage. The longitudinal tube portions 2a and 3a are spaced sufficiently from one another to receive the wheel W of a car between them. The spacing of the longitudinal tube portions 2a and 3a from the sidewalls L and R is sufficiently greater than the lateral overhang of a car so that as long as the wheels of the car are between the longitudinal tube portions the car cannot strike the sidewalls of the garage or any objects stored along the sidewalls. The transversely extending tube portions 2b and 3b are spaced from the rear wall B of the garage a distance sufficiently greater than the front overhang of a car so that the front wheels of the car will engage the transverse tube portions before the front end of the car engages the rear wall of the garage or any objects stored along the rear wall.

The tubes 2 and 3 are further shown as comprising wing portions 2c and 3c which diverge angularly at the front ends of side portions 2a and 3a to provide a funnel-shaped configuration serving to guide a car into the space between the side portions 2a and 3a.

The tubing 1 extends along the floor F of the garage and is held in place by suitable anchoring means. In the embodiment illustrated in FIG. 1, the anchoring means comprises brackets 4 engaging the front ends of tube portions 2a and 3a and connected by a wire 5. Wires 6 secured to the walls of the garage at the rear corners are provided at their free ends with brackets 7 which engage the tubing at the junctions between the longitudinal and transverse portions. Each of the brackets 7 is provided with a curved surface which engages the tubing so that the tubing is not bent too sharply. The wires 6 extend outwardly and rearwardly from brackets 7 and are secured to the walls of the garage near the floor by any suitable means for example screw eyes or staples. The transverse tubing portions 2b and 3b are mechanically connected together at 8 without, however, being in communication with one another.

The tubes 2 and 3 are closed and anchored at their forward ends by fittings 9 which are secured to the floor or pavement. The brackets 4 and 7 may likewise be secured to the floor, thus dispensing with the wires 5 and 6. The fittings 9 and brackets 4 and 7 cooperate to hold the tubing securely in selected position. At least the side portions 2a and 3a are held taut or stretched so that they will not be deflected laterally by the wheels of a car. Preferably the tubing is sufficiently elastic and extensible in a longitudinal direction that the side portions 2a and 3a can be lifted up to permit cleaning of the floor and will return to their proper positions when released.

The rear end of the tube 2 is connected by a fitting 11 and tube 12 to a pressure responsive switch 13 having electrical contacts 14. In like manner, the rear end of the tube 3 is connected by a fitting 16 and tubing 17 to a pressure responsive switch 18 having electrical contacts 19. The pressure responsive switches 13 and 18 may be of any desired kind and are illustrated as being diaphragm-type switches. The tubes 2 and 3 together with connecting tubing 12 and 17 are full of liquid or gas which is sealed in by the closures 9 at one end and the diaphragms of switches 13 and 18 at the other.

The signalling means is shown in FIG. 1 as comprising electrical lamps 22 and 23 which are preferably mounted on the rear wall B of the garage in such position as to be readily seen by the driver of a car. The lamps 22 and 23 are preferably red but may, if desired, be of different colors so as to be differentiated from one another by color as well as by position. Power is supplied through suitable leads 26 from a 110 volt A.C. or other source and may be reduced in voltage by a small stepdown transformer 27. From the wiring diagram of FIG. 1, it will be seen that the lamp 22 is connected to the secondary of the transformer 27 through the contacts 14 of the pressure responsive switch 13 so as to be lighted when the contacts are closed. Similarly, lamp 23 is connected to the secondary of the transformer through the contacts 19 of pressure responsive switch 18. If it is desired to provide an audible as well as visual signal, a bell or buzzer is connected in series or in parallel with each of the lamps so as to be energized when the corresponding lamp is lighted. Preferably, the two audible signals are of different tone so as to be differentiated from one another.

From the foregoing description and the drawing, it will be seen that if the car C gets too far to the left while being driven into the garage, one or both of the left wheels will run on the longitudinal portion 2a of the tube 2 thereby increasing pressure in the tube and actuating the switch 13 to energize the left hand signal 22. Conversely, if the car gets too far to the right, one or both of the right hand wheels will run on the longitudinal portion 3a of the tube 3 and compress the tube to actuate the corresponding switch 18 and thereby energize the right hand signal 23. If the car goes too far forward, the front wheels will run on and compress both of the transverse tubing portions 2b and 3b so as to actuate both signals. The driver is thus provided with a warning signal if he gets too close to either of the sidewalls or to the rear wall of the garage.

Another embodiment of the invention is shown in FIG. 2 in which corresponding parts are designated by the same reference numerals as in FIG. 1 with the addition of 30. Except as otherwise shown and described, the system shown in FIG. 2 is like that of FIG. 1. It comprises longitudinally extending tube portions 32 and 33 which lie on the floor F of the garage and are spaced from and approximately parallel to the sidewalls L and R. A separate third tube portion 40 extends transversely of the garage, being spaced from and approximately parallel to the rear wall B. The tubing is held securely in place by suitable anchoring means illustrated as anchor wires 34, 35 and 36. The left hand tube 32 is connected by a fitting 41 and tube 42 with a pressure responsive switch 43 having contacts 44. The right hand tube 33 is connected through a fitting 46 and tube 47 with a pressure responsive switch 48 having contacts 49. The transverse tube 40 is connected in like manner with a third pressure responsive switch 50 having contacts 51.

The signal means of the embodiment shown in FIG. 2 is illustrated as comprising a left hand lamp 52, a right hand lamp 53 and a central lamp 54. The left lamp 52 is connected with the secondary of a transformer 57 through the contacts 44 of switch 43 so as to be energized when the tube 32 is compressed. The right lamp 53 is connected to the secondary of the transformer 57 through the contacts 49 of the switch 48 so as to be energized when the right hand tube 33 is compressed. The central lamp 54 is connected to the secondary of the transformer 57 through the contacts 51 of the switch 50 so as to be energized when the transverse tube 40 is compressed. The operation of the embodiment of FIG. 2 is similar to that of FIG. 1. If the car gets too far to the left, the tube 32 is compressed and energizes the signal lamp 52. In like manner, the signal lamp 53 is energized if the car gets too far to the right so as to compress the right tube 33. If the car goes too far forward, the front wheels engage and compress the transverse tube 40 and thereby energize the central signal lamp 54.

A somewhat simpler embodiment of the invention is shown in FIG. 3 in which corresponding parts are designated by the same reference numerals as in FIG. 1 with the addition of 60. Except as otherwise shown or described, the embodiment of FIG. 3 is like that of FIG. 1. In FIG. 3, the pressure responsive means engageable by the car wheels comprises a left hand tube 62 and a right hand tube 63. The tube 62 has a longitudinally extending portion 62a and at its front end an outwardly inclined wing portion 62c. The tube 63 has a longitudinally extending portion 63a, a transverse portion 63b which is spaced from and approximately parallel to the rear wall of the garage and a forward wing portion 63c. The tubing is held in position by suitable anchoring means shown as wires 64, 65 and 66. To facilitate anchoring, the tubes 62 and 63 are mechanically connected at 68 without being in communication with one another.

The left hand tube 62 is connected through a fitting 71 and tube 72 to one side of a double acting diaphragm switch 80 having two sets of contacts 74 and 79. The right hand tube 63 is connected through fitting 76 and tube 77 to the opposite side of the double acting switch 80. While the fittings 71 and 76 appear to be in front of one wheel of the car in the schematic drawing, it will be understood that in actual construction, they would be positioned so that both front wheels would be engageable with the transverse tube portion 63b. The diaphragm of the switch 80 is movable in one direction by an increase of pressure in tube 62 to close contacts 74 and is movable in the opposite direction by an increase of pressure in the tube 63 to close contacts 79.

The signal means shown in FIG. 3 comprise a left hand lamp 82 and a right hand lamp 83. The lamp 82 is connected to the secondary of a transformer 87 through contacts 74 so as to be energized by an increase of pressure in the tube 62. The lamp 83 is connected to the secondary of the transformer 87 through contacts 79 of the switch 80 so as to be energized upon an increase of pressure in the tube 63. With the arrangement shown, the lamp 82 lights if the car gets too far to the left. The lamp 83 will light if the car gets too far to the right or too far forward. The wing portions 62c and 63c of the tubing assure that the car enters between the longitudinal portions 62 and 63.

In FIGS. 4, 5 and 5a there is shown a preferred form of corner bracket or clamp for anchoring the tubing in place. The bracket 7 is shown as comprising a flat base portion 7a and a curved hose-engaging channel portion 7b provided centrally at its upper edge with a projecting tab portion 7c. The channel portion 7b is of double curvature corresponding approximately to a toroid. In cross section, the channel portion 7b is approximately semicircular with a radius of curvature corresponding to that of the tubing 1 so as to fit snugly around the tubing as shown in FIG. 5. As viewed in plan (FIG. 4), the channel portion has a radius of curvature sufficiently large to avoid kinking the tubing. For example, a radius of curvature of approximately two inches has been found satisfactory. The tab portions 7c are initially approximately parallel to the base 7a as shown in FIG. 5. After the tubing 1 is positioned in the bracket, the tab 7c is bent downwardly as shown in FIG. 5a so as to retain the tubing and hold it against lengthwise movement relative to the bracket 7. A hole 7d is provided in the base portion 7a to receive the wire 6 or other securing means for anchoring the bracket.

As shown in FIGS. 5 and 6 a fitting 9 for closing and anchoring the forward ends of the tubing 1 comprises a cylindrical plug fitting tightly into the end of the tubing. Intermediate its ends the plug is provided with an annular channel or recess 9a. The outer end of the plug is reduced to provide a flat lug portion 9b. The plug 9 is inserted in the end tubing as illustrated in FIGS. 6 and 7 and a band 10 is contracted around the tubing so as to squeeze a portion of the tubing wall into the recess 9a and holding the plug against withdrawal. A hole 9c is provided in the lug portion 9b to receive a wire, spike, screw, expansion bolt or other securing means for anchoring the fitting 9.

As shown in FIG. 8, each of the intermediate brackets 4 (FIG. 1) comprises a strap member which passes around the tubing 1 and has laterally projecting superposed end portions 4a. Aligned holes 4b in the end portions 4a receive the wire 5 or other securing means for anchoring the brackets 4 in place.

FIG. 9 illustrates an application of the signal system in accordance with the invention to a two-car garage having a left side wall L, right side wall R and a back wall B. The signal system is shown as comprising longitudinally extending tubing portions 101 and 102 connected by a transverse portion 103 to define a space for receiving one car and longitudinal tubing portions 104 and 105 connected by a transverse portion 106 to define an area for receiving a second car. The several tubing portions may, if desired, be connected to individual signal devices as illustrated for example in FIG. 1, 2 or 3. However, since only one car will ordinarily be driven into or out of the garage at a time, a single signal device may be used for both of the car areas. Thus, as shown in FIG. 9, the tubing portions 101 to 106, are connected by a suitable hose or tubing 107 to a signal device 108 mounted on the back wall B of the garage and comprising a pressure-responsive switch and an electric light. It will be understood that the tubing portions 101 to 106 are securely anchored in selected positions, for example as illustrated in FIG. 1, and that at least the longitudinally extending tubing portions are under tension so as to resist deflection by the tire wheels. A tension resulting from an 8-inch elongation of the longitudinal hoses has been found satisfactory in most cases.

As the longitudinal portions of the tubing in all embodiments of the invention extend substantially the full length of a car, any deviation of the car to the right or left from its proper path will be immediately detected. It will be understood that instead of being disposed on opposite sides of a car, the longitudinally extending tubing portions may be positioned so as to be on opposite sides of the left wheels of a car or on opposite sides of the right wheels of the car. Thus for example in FIG. 3 the tube 62 instead of being to the left of the left hand wheels W1 and W3 may be disposed to the left of the right hand wheels W2 and W4. Alternatively one tube may be positioned to the right of the left wheels W1 and W3 and the other to the left of the right wheels W2 and W4.

FIGS. 10 and 11 illustrate an embodiment in which two tubes for detecting deviation of the vehicle to the right or to the left from a selected path are combined in a unitary construction. The unit 110 comprises an elongated flat band or strip portion 111 and compressible tubes 112 and 113 extending along opposite side edges of the strip. Preferably, the strips and tubes are formed integrally of suitable plastic, rubber or other elastomer material, for example as an extrusion. The unit 110 and in particular the strip portion 111 may be suitably reinforced. The unit 110 is of a length corresponding approximately to the length of the car and is of such width that the tubes 112 and 113 are spaced apart sufficiently to receive the wheel W of a vehicle between them as illustrated in FIG. 11. The front ends of the tubes 112, 113 are closed. The rear ends are connected by fittings 114, 115 and 116 and short hose sections 117, 118 and 119 to a hose 120 leading to a pressure switch controlling a signal device. The hose section 119 extends transversely of the strip 111 in such position that it will be compressed by a vehicle wheel running beyond the end of the strip.

To guide a car into a garage, the unit 110 is laid on the floor of the garage parallel to the side walls and in such position that when a car is driven properly into the garage either the right or the left wheels of the car will run on the strip 111 between the tubes 112 and 113. The strip extends from the front of the garage substantially to the rear, the transverse tube 110 being located a distance from the rear wall somewhat greater than the front overhang of the car. The unit 110 is securely anchored in place, for example, by means of the fittings 114 and by wires 121 or other securing means engaging reinforced eyelets 122 provided at the front end of the strip 111. Diverging wing portions corresponding to tube portions 2c and 3c of FIG. 1 may be provided at the front end of the unit if desired to assist in guiding the wheels of a vehicle into the space between the tubes 112 and 113. If a car deviates from its intended path a distance greater than that permitted by the spacing of the tubes 112 and 113, one or another of the tubes will be compressed to actuate the signal device. Likewise, if the car is driven too far forward so as to engage the transverse tube 119, the signal will be actuated.

FIG. 12 illustrates a signal unit that may be utilized with the pressure-responsive unit of FIG. 10 or other embodiments of the invention. The unit of FIG. 12 comprises a housing 125 containing a pressure-responsive switch 126 and an electric lamp socket 127. The pressure-responsive switch 126 is connected by a conduit 120 with the corresponding pressure-responsive unit for example, that illustrated in FIG. 10. The socket 127 is connected through the switch 126 to a suitable power supply 128 and receives an electric lamp 129 enclosed in a translucent removable casing 130 which is preferably red or other selected color. The unit is preferably mounted on the rear wall of the garage in position where it will be seen by the driver of a car entering or backing out of the garage.

Insofar as they are compatible, the features of each embodiment shown and described may be applied to the other embodiments. Still other modifications within the scope of the invention will be apparent to those skilled in the art and the invention is hence not limited to the embodiments herein shown and described by way of example. The term "car" is herein used broadly to designate wheeled vehicles, and the term "garage" is used broadly to designate any enclosure or space for such vehicle.

What I claim and desire to secure by Letters Patent is:

1. In a rectangular garage for a motor car having wheels and a car structure supported on said wheels, said garage having side and end walls and a floor, one said end wall being closed and the other end wall defining an opening for the entrance and exit of said car to and from said garage, a signal system for use in guiding said car in and out of said garage comprising: elongated pressure-responsive means physically continuous but having a plurality of portions each said portion being separately responsive to pressure on said portion, anchored on said floor for pressure actuation by said wheels rolling thereon, said pressure responsive means defining an open-ended rectangular space for receiving the wheels of said car, said space having sides and a closed end adjacent the parallel side walls and closed end wall respectively of the garage, and the open end of the space coinciding with the opening of the garage, said sides being respectively spaced from said parallel side walls and said closed side from said closed end wall a distance sufficient for a wheel to roll on a pressure-responsive means defining said sides and end before the car structure strikes the wall of the garage adjacent said sides and end, and said sides being spaced apart for the untouching passage of said wheels therebetween when the car is driven through the garage opening parallel to said side walls; fastening means for anchoring said operative pressure-responsive means on said floor; and signal means mounted in said garage and operably connected to said portions of the pressure-responsive means and responsive to actuation thereby for signalling when one of said wheels rolls on which portions of said pressure-responsive means, whereby a wall indicating warning signal is given before said car structure can strike an indicated wall when said car is driven in and out of said garage.

2. A signal system according to claim 1, in which said signal means comprise visual signals mounted on the garage wall at the rear of the garage in position to be seen by the driver of a car driven into said garage.

3. A signal system according to claim 1, in which said signal means is electrical and is connected to and controlled by signal switch means, said switch means being connected to and actuated by said pressure responsive elements to energize said signal means in accordance with an applied pressure to said pressure responsive elements.

4. A signal system according to claim 1, in which said pressure responsive means comprises hollow compressible elastic tubing having portions each closed at one end and adapted to transmit a pressure from the other end by compressing said portion and in which said fastening means comprises a bracket having a flat base portion, a curved channel portion extending upwardly from the base and embracing said tubing, and a bendable tab portion integral with said channel portion and bent into engagement with said tubing to retain said tubing in said channel portion and restrain said tubing against movement in a lengthwise direction relative to said bracket in uncompressed condition.

5. A signal system according to claim 4, in which said hollow compressible elastic tubing is held in longitudinally stretched condition by said anchoring means at corners of said defined space whereby said tubing is raisable for cleaning thereunder and around.

6. A signal system for use in guiding a car, having wheels and a body structure supported on said wheels, into a rectangular garage having a floor, side and end walls with an entrance in one end wall, said signal system comprising in combination two elongated pressure-responsive elements for actuation by rolling contact of a wheel of said car, said elements being anchored on the floor of the garage and extending beyond said opening outwardly toward said side walls extended to define a rectangular space having a flared open end, and a closed end and each said element defining a side and half the closed end of said rectangular space, said sides and end being respectively adjacent the side walls and other end wall of said garage, and said flared open end of said rectangular space coincident with the entrance of said garage, said sides defined by said elongated element being spaced transversely apart for the straight passage of said car wheels therebetween, and said sides and closed end defined by said elements being spaced from said side and end walls of said garage a distance sufficient for a wheel to roll on an element before said body structure strikes the adjacent wall; signal means mounted in said garage and visible from said car operably connected to each of said pressure-responsive means for respectively signalling which pressure-responsive element is rolled on and simultaneously signalling when the wheels reach the closed end to roll on both said elements whereby a correction indicating warning signal is given before the body structure of a car can strike a wall while parking in the garage.

7. A signal system according to claim 6, in which said signal means comprises a housing for mounting said signal means, a pressure responsive switch enclosed in said housing, and an electric lamp socket mounted in said housing, means operably connecting said switch with said pressure responsive means, for actuating said switch means connecting said socket through said switch to an electrical supply for selectively energizing and deenergizing said socket, a lamp in said socket for lighting when said socket is energized for the protection thereof, and a translucent casing removably secured to said housing and covering said lamp.

References Cited in the file of this patent

UNITED STATES PATENTS

| | | |
|---|---|---|
| 1,836,655 | Dunford | Dec. 15, 1931 |
| 1,950,301 | Hall et al. | Mar. 6, 1934 |
| 2,107,350 | Stubbins | Feb. 8, 1938 |
| 2,153,277 | Sharp | Apr. 4, 1939 |
| 2,251,180 | Wesley et al. | July 29, 1941 |
| 2,330,205 | Cox | Sept. 28, 1943 |
| 2,454,896 | Traub | Nov. 30, 1948 |

FOREIGN PATENTS

| | | |
|---|---|---|
| 615,554 | Germany | July 8, 1935 |
| 531,496 | Great Britain | Jan. 6, 1941 |
| 142,044 | Australia | July 9, 1951 |